No. 835,357. PATENTED NOV. 6, 1906.
J. L. JANEWAY.
PLANT AND ANIMAL EXTERMINATOR.
APPLICATION FILED SEPT. 30, 1905.

Witnesses
Wm. Koerth.
C. C. Hines.

Inventor
John L. Janeway.
By Victor J. Evans.
Attorney

THE NORRIS PETERS CO., WASHINGTON, D. C.

UNITED STATES PATENT OFFICE.

JOHN L. JANEWAY, OF MONTGOMERY COUNTY, NEAR PAWLING, PENNSYLVANIA.

PLANT AND ANIMAL EXTERMINATOR.

No. 835,357.　　　　　Specification of Letters Patent.　　　　Patented Nov. 6, 1906.

Application filed September 30, 1905. Serial No. 280,794.

*To all whom it may concern:*

Be it known that I, JOHN L. JANEWAY, a citizen of the United States of America, residing in Montgomery county, near Pawling, in the county of Chester and State of Pennsylvania, have invented new and useful Improvements in Plant and Animal Exterminators, of which the following is a specification.

This invention relates to a device for destroying weeds, tree-stumps, and burrowing animals, and has for its object to provide a simple and effective construction of apparatus whereby weeds of the deep-root variety, the stumps of trees, and burrowing animals may be readily and conveniently exterminated by a process of boring into the heart or tap-root of the weed or stump or the subterranean resorts of burrowing animals, such as gophers and the like, and feeding into the bore or hole thus formed a suitable destroying medium.

Figure 1:
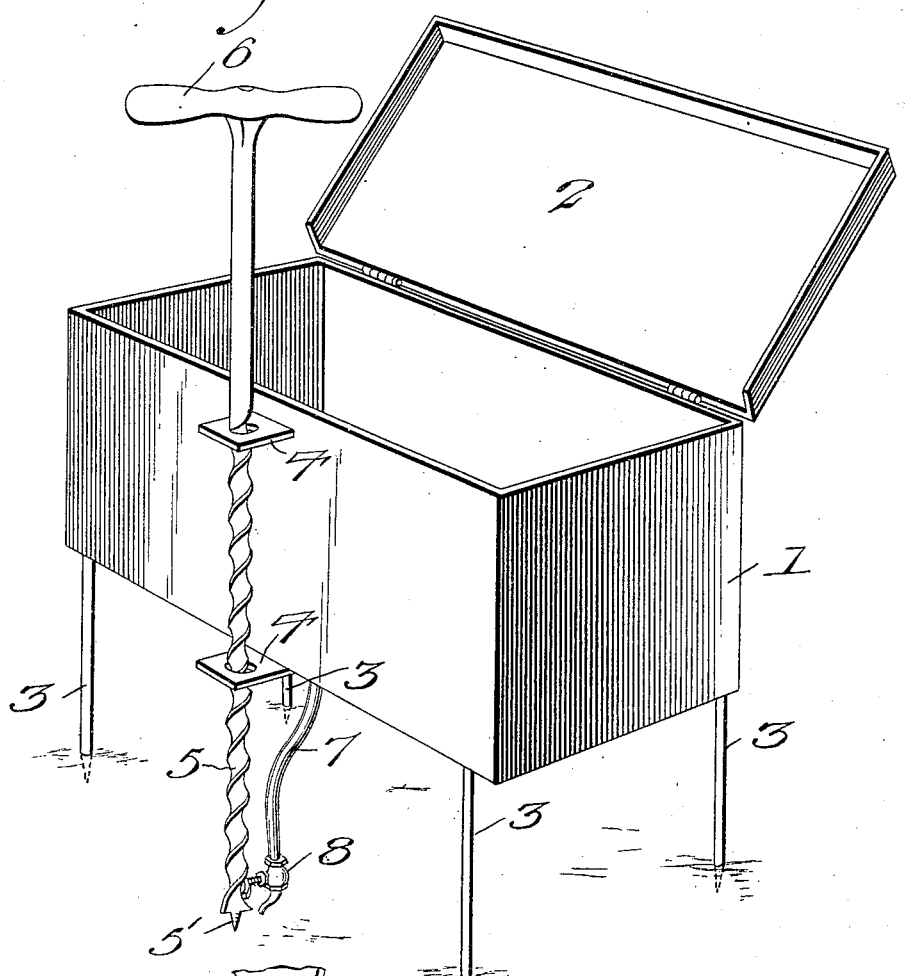
Figure 2:
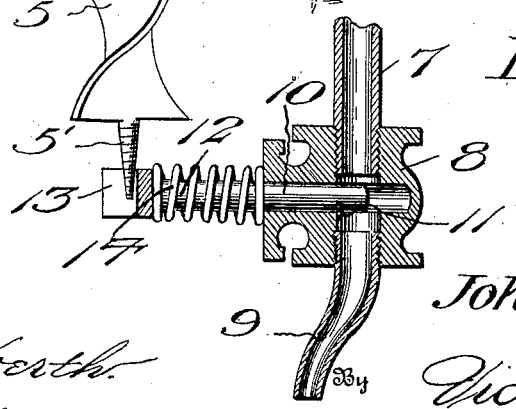

In the accompanying drawings, Figure 1 is a perspective view of a destroying apparatus embodying one of the forms of my invention. Fig. 2 is a vertical section through the ejector, on an enlarged scale, showing the valve open for the discharge of the destroying fluid or liquid.

In the said drawings the numeral 1 denotes a frame in the form of a box or receptacle of any preferred shape and size and constructed of any suitable and desired material, the said box or receptacle being open at top and adapted to be closed by a hinged lid or cover 2 or any other suitable closure. This box is adapted to contain a supply of the destroying agent, which may be of any of the kinds ordinarily used and in solid or liquid form. I may use kerosene or any of the known animal or vegetable poisons or a composition which may contain kerosene, calcium carbid, sulfate of copper, sulfate of iron, caustic potash, caustic soda, and nitrate of potash. Either of these agents may be fed into the bore and allowed to remain to accomplish its purpose. The box or receptacle 1 is preferably mounted upon legs or other suitable supports 3, which may be pointed or otherwise constructed, so as to be readily forced into the ground to hold the device firmly in position while the operation of boring is being carried out.

The box or receptacle is provided upon one of its vertical walls with bearings 4, preferably in the nature of bracket-plates, in which is revolubly mounted a boring device, shown in the present instance in the form of a gimlet-pointed auger-bit 5, carrying at its upper end an operating-handle 6, but any other suitable type of boring device may be used.

In operation the box or receptacle is deposited alongside the plant or stump to be destroyed or at the point where an inlet into the subterranean galleries or habitations of the animals to be exterminated is to be made and the boring device then operated to bore into the heart or root of the plant or stump or galleries as aforesaid, after which the boring device is removed and the destroying agent fed into the bore. In some instances it is found that the boring operation will be sufficient to destroy a plant, and in such cases the destroying agent need not be used; but when deep-rooted and hardy plants are operated upon the use of the destroying agent will ordinarily be found necessary. I may in some cases use fumes or gases as the destroying agent, or I saturate a suitable vehicle with kerosene, nitrate of potash, or any other combustible agent and ignite the same to cause the destruction of the object sought by fire.

The present invention provides automatic means for feeding a destroying agent into the bore formed by the boring device upon the retraction of the latter. In the present instance I have shown a discharge-pipe 7 communicating at its upper end with the receptacle 1 and at its lower end with a valve-casing 8, having an ejector-nozzle 9 disposed in line with said pipe. The flow of fluid or liquid from the pipe 7 to the nozzle 9 is controlled by a valve 10, slidably mounted in the casing between the proximate ends of the pipe and nozzle and limited in its outward movement by a stop-pin 11. The valve has an outwardly-projecting stem 12, carrying a properly-shaped shoe 13 to engage and ride within the spiral groove of the bit 5. The valve is adapted to be automatically opened by a coiled spring 14, surrounding said stem and between the casing and shoe. Normally the shoe engages the body of the bit 5 and is retained thereby in position to hold the valve 10 closed against the pressure of the spring 14, thus preventing the discharge of the destroying fluid or liquid from the receptacle 1. When the auger is retracted or withdrawn from the bore formed in the root or stump of the plant or in the earth, as before described, the shoe 13 will engage the lower end of the same, as shown in Fig. 1, and the valve will still be held closed, but if it is desired to allow the liquid or fluid to flow into the bore the auger is given a further upward movement to bring the body of the same above the shoe 13 and the gimlet-point 5' in line therewith, whereupon the valve will be free to be opened by the spring 14. The valve may be closed to cut off the flow of destroying fluid by again turning the auger down to its normal position, (shown in Fig. 1,) as will be readily understood. In this manner any desired amount of destroying liquid may be quickly and conveniently allowed to pass into the bore after the latter has been formed.

It will be observed that the box or receptacle not only serves as a container for the destroying agent, but as a support for the boring-tool, whereby the construction is simplified and the boring-tool maintained always in position for use. Other advantages of the invention will be readily appreciated by those versed in the art.

Having thus described the invention, what is claimed as new is—

1. In an exterminating device of the character described, the combination of a liquid-receptacle, a valved discharge leading therefrom, and a boring device mounted upon the receptacle and adapted upon its retraction to open the valve of said discharge device for the outflow of liquid.

2. In a plant or animal exterminator, the combination of a receptacle provided with an outlet, a borer supported by said receptacle, and a valve normally held closed by the borer and adapted to be moved to open position when the borer is retracted to a predetermined point.

3. In a plant or animal exterminator, the combination of a receptacle having an outlet, a boring device supported thereby, and a spring-opened valve controlling said outlet and normally held closed by the boring device and adapted to be opened upon a prescribed retractive movement of the latter.

4. A plant or animal exterminator comprising a receptacle having an outlet, a borer supported thereby and having a gimlet-point, a valve controlling the outlet, a spring for forcing the valve open, and a shoe connected with the valve and adapted to ride upon the boring device to hold the valve closed, and to move in contact with the gimlet-point when the borer is retracted to permit the valve to open.

5. A plant or animal exterminator comprising a receptacle having a discharge-pipe, a spring-actuated valve arranged in said pipe, a boring device comprising an auger mounted upon the receptacle and having a reduced portion, and a contact member upon the valve adapted when engaged with the auger-body to hold the valve closed and on coming into contact with said reduced portion to permit the valve to open.

6. In a plant or animal exterminator, the combination of a holder for a destroying agent, a boring device mounted thereon, and means controlled by said boring device for feeding a quantity of the destroying agent into the bore formed thereby.

7. In a plant or animal exterminator, the combination of a holder for a destroying agent, a boring device carried thereby, and automatic means for feeding a quantity of the destroying agent into the bore formed by the boring device upon the retraction of the latter.

In testimony whereof I affix my signature in presence of two witnesses.

JOHN L. JANEWAY.

Witnesses:
C. R. EYRICH,
SAML. WILSON.